Figure 1:
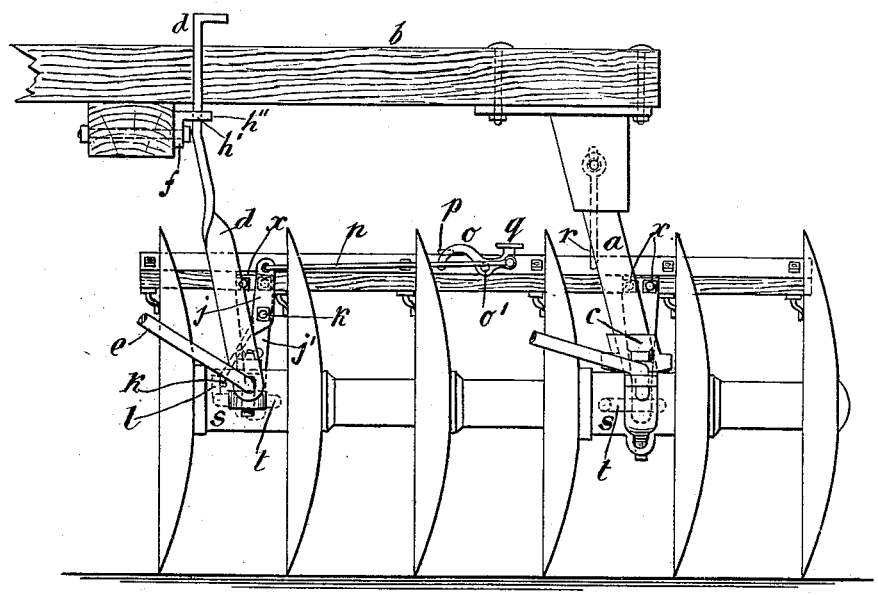

(No Model.)　　　　　　　　　　　　　　　　2 Sheets—Sheet 1.
A. G. HILL.
DISK HARROW.

No. 487,622.　　　　　　　　　Patented Dec. 6, 1892.

WITNESSES:　　　　　　　　　　　　　　INVENTOR,
John Becker　　　　　　　　　　　　　Andrew George Hill
John Fraser (No Model.) 2 Sheets—Sheet 2.
A. G. HILL.
DISK HARROW.
No. 487,622. Patented Dec. 6, 1892.
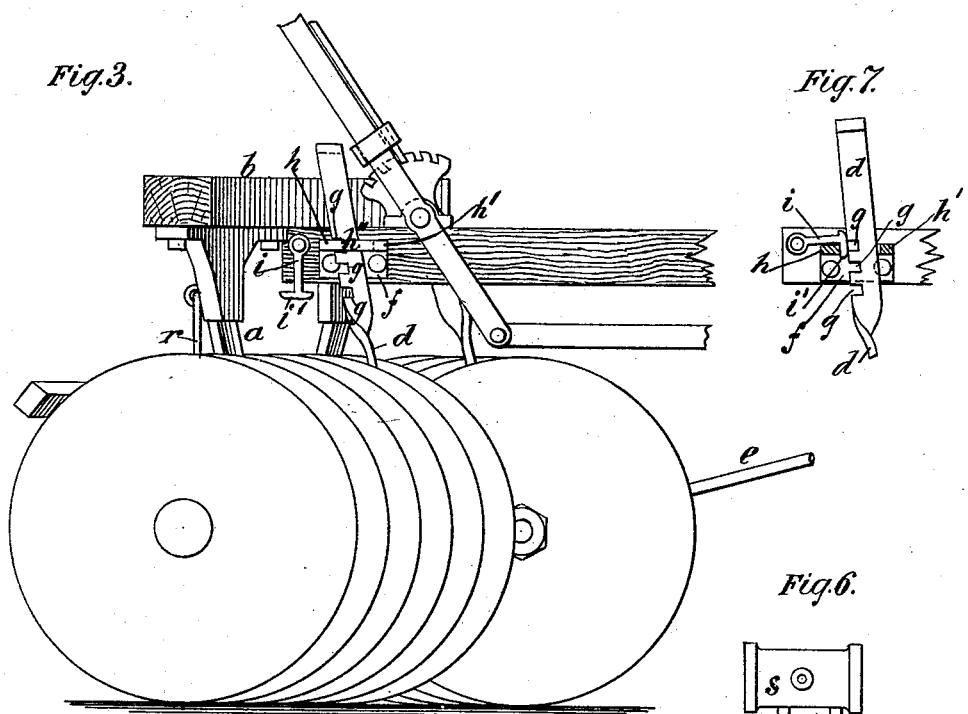
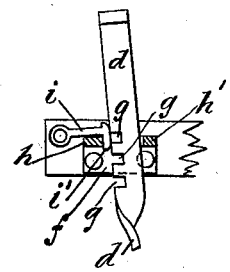
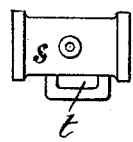
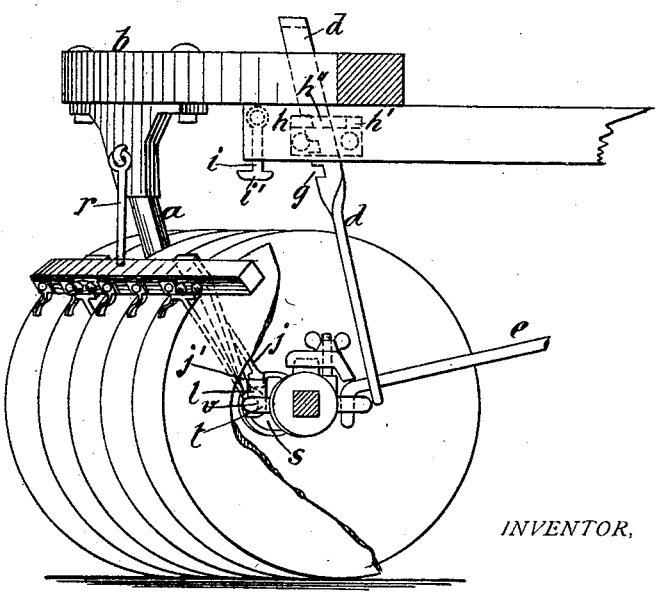
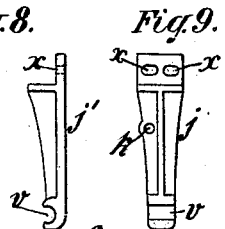
WITNESSES:
John Becker
John Fraser
INVENTOR,
Andrew George Hill

UNITED STATES PATENT OFFICE.

ANDREW GEORGE HILL, OF PRESCOTT, CANADA; TORRENCE E. BISSELL ADMINISTRATOR OF SAID HILL, DECEASED.

DISK HARROW.

SPECIFICATION forming part of Letters Patent No. 487,622, dated December 6, 1892.

Application filed June 25, 1891. Serial No. 397,517. (No model.)

*To all whom it may concern:*

Be it known that I, ANDREW GEORGE HILL, a citizen of the United States, and a resident of the city of Prescott, in the Province of Ontario and Dominion of Canada, have invented certain new and useful Improvements in Disk Harrows, of which the following is a specification, reference being had to the drawings forming part thereof.

My invention consists, first, in rendering the disk gangs of a harrow rigid or flexible at will of the driver during the working of the same at a fixed angle over the field; second, in means for keeping the scrapers continuously in contact with the disks without the aid of hand-levers and without interfering with the free vibrations of the gangs in the workings of the harrow; third, in an improved construction of the devices by which the scraper-beams and scrapers are connected with the disk gangs, thereby avoiding the rapid wear of parts and resulting heavier drag of the harrow experienced with the older constructions; fourth, in certain details of construction hereinafter described and claimed.

By reason of the first part of my invention there is provided means for making the harrow rigid while it is working at the angle at which it has been set and holding the inner ends of the gangs rigidly in either an elevated or depressed position, and by which whenever desired the harrow may instantly be made flexible and without stopping the horses. It has been found that on hard lumpy soil a harrow needs to be stiff, so that when the disks meet a clod it will have sufficient weight to cut through it, and as soft and hard spots are met with on every field it is very desirable to have the harrow instantly convertible from a flexible to a stiff harrow, and vice versa.

By reason of the second part of my invention there is provided means for holding the scrapers to the disks continuously when it is so desired, and so that the free vibration of the gangs are not thereby interfered with. By the use of hand-levers as heretofore practiced it keeps a driver quite busy applying the scrapers so as to have the disks well scraped in sticky soil. Furthermore, in the use of hand-levers mounted on the main beam of a flexible harrow of the type mostly used at the present day the front ends of the gangs are pulled up out of the soil when scraping, which is very objectionable.

By reason of the third part of my invention there is provided a means for cleaning the disks by a series of scrapers mounted on a beam, which beam is supported parallel to the axle by hangers, which latter do not have wearing-surface on the spools, but rest on the boxes. When the scraper-hangers rest on the spacing-spools adjacent to the boxes, as heretofore, these spools wear out rapidly and cause the harrow to draw heavier.

Figure 2:
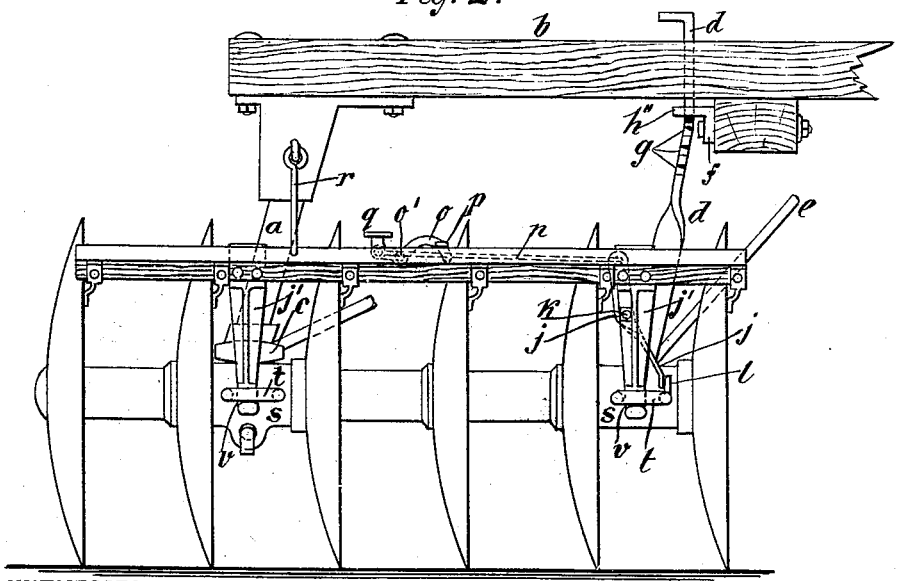

In the drawings, Figure 1 is a front view of the left gang of a harrow to which my improvements are applied. Fig. 2 is a rear view thereof. Fig. 3 is a side view of the harrow, showing the inclination of the disk-gang stiffeners when the disk gangs are set at a working angle. Fig. 4 is a side view of the left stiffener, showing the manner of its attachment to the connecting-rod and the retention of both in place by the oil-cap. Fig. 5 is a top view of the left inside or connecting rod box, showing the slot in which one of the scraper-hangers rests. Fig. 6 is a top view of the outside or hanger box, showing the slot in which the other scraper-hanger rests. Fig. 7 is a view of the upper portion of one of the stiffener-rods and of the casting through which the rod passes, also of the notches on the rod for engaging with the rear end of the slot, and also of the dog to prevent such engagement. Fig. 8 is a side view of one of the scraper-beam down-hangers. Fig. 9 is a rear view thereof.

The left-hand side of a harrow is principally shown in the drawings. The gang of disks for the right hand being a duplicate of the left-hand gang, it is not considered necessary to describe it in detail.

*a* is the down-hanger attached to the main or cross beam *b* at its upper end and at its lower end to the journal and connecting or brace rod box *c* on the gang-axle.

In order to have the disk gangs rendered flexible or rigid at will of driver for the purpose above stated, the following means are combined with the disk gang, namely: *d* is a stiffener-rod connected to the disk gang by the draw-bar *e*, passing through an eye at its lower end. The upper portion of this rod *d* passes up through a slot or opening formed on a plate or casting *f* by two projecting bars *h h'*, and one bar *h''*, connecting together the ends of the latter two. This plate is secured to the side of the pole. The rear edge of this upper portion of rod *d* contains a series of notches *g g*, &c., of sufficient size to engage with the rear bar or end *h* of the slot-plate *f*. When the bar *h* engages with any one of these notches, the inner end of the disk gang is locked and it cannot until released either rise or fall during the working of the harrow. A dog *i* is pivoted to the side of the tongue at the rear of the slot-plate *f* and has a face *i'* of the width of the slot formed by said bars *h h' h''*. When the dog is thrown forward, this face *i'* will pass over and within the bar *h*, so that there can be no engagement of any one of the notches *g* with such bar, and hence no interference with the flexible movement of the disk gang. At the top of the stiffener-rod *d* is a foot-plate, by means of which the rod can be moved along the length of the slot, so as to engage or disengage the notches *g* from the bar *h*, as may be desired, and also to shift the rod vertically, so as to have the inner end of the disk gang run at any required depth.

Heretofore chains have been used to hold up the inner ends of the disk gangs, which only partially accomplish the object, as the ends were not rigidly held. There has also been used a brace pivoted to the main frame, with its ends swinging into the top of the outer ends of the frames of the disk gangs, the inner ends of such frames being flexibly hinged to the pole upon opposite sides. The latter was a permanent stiffener to the disk gangs, rendered necessary by reason of the peculiar construction and arrangement of the disk gangs to the harrow; nor did either of such constructions give the harrow the capacity of disk gangs, being either rigid or flexible, at will of driver, during the working of the harrow.

My improvements give the first harrow that has employed disk gangs which are rigid and flexible at their inner ends at the will of the driver while the harrow is working at a given angle.

*j* is a flat spring mounted on the front of the scraper-beam hanger *j'*, having a pivotal point at *k*. The portion of the spring below the pivotal point is given a half-twist and an outward bend, so that its lower end will butt against a projection *l*, placed on the inner end of the slot on the journal-box. To the upper end of the spring is pivoted a rod *n*, extending along the top of the scraper-beam to within a convenient distance of the driver's seat. A dog *o* is here connected to the end of the rod and pivoted at *o'* to the scraper-beam. When the longest lever of the dog *o* is pressed down to the scraper-beam, as seen in Figs. 1 and 2, the end of the rod *n* is just past the center of the pivotal point of the dog, and further motion in this direction is here stopped by reason of a projection *p* on the longest lever of the dog coming into contact with the scraper-beam. This throwing forward of the rod and upper end of the spring *j* brings a pressure against the projection *l*, and the scrapers are thus kept in contact with the disks, notwithstanding any vibration of the latter. When it is desired to relieve this spring-pressure of the scrapers against the disks, the driver's foot is pressed down upon the foot-plate *q* on the end of the short lever of the dog. The passing of the centers of the two pivotal points named will move the rod and push the upper end of the spring *j*, thus releasing the pressure of the lower part of the spring from the projection *l*. A very short movement of the rod will throw the scrapers in or out of contact with the disks. The lower part of the spring *j* does not extend down into the slot *m*, so that when the scraper attachment is dropped to the ground by lifting the hook *r* the bottom of said spring moves outside of said slot and clear of the disk gang. The scraper-beam hanger *j'*, to which the spring *j* is attached, is shown slotted at points *x x*, where it is connected to the scraper-beam, by means of which the tension desired to be placed on the spring can be regulated. With reference to the third part of this invention, instead of mounting the scraper-beam hangers on the axles or spools rigidly connected therewith, as heretofore, they are mounted on the disk-gang journal-boxes *s s*. Slots *t t* are made in the rear sides of these boxes. The lower ends of each of the hangers *j' j'* are curved, so as to form semicircular hooks *v v*. These hooks *v v* hook into the outer edge of the slots *t t*. In Figs. 8 and 9 will be found two views of this construction of scraper-beam hanger.

In Figs. 5 and 6 will be seen the slotted journal-boxes for one of the disk gangs. It is evident that this construction will admit of lateral movement of the scraper-beam and of the easy removal of the whole scraper-beam mechanism when desired, as above stated. These hangers are by preference bolted to the front side of the scraper-beam, two bolts to each hanger.

I claim—

1. In a disk harrow, the combination, with the disk gangs, of a notched bar whereby the disk gangs of a harrow are rendered rigid or flexible in the vertical plane at will of driver while they are working at a fixed angle over the field, substantially as described.

2. In a disk harrow, a scraper-beam pivotally mounted upon the gang and adjusted laterally thereon by means of the vertical spring $j$, connecting-rod $n$, and locking foot-lever $q$, substantially as described.

3. In a disk harrow, the combination, with the scraper-beam and scraper-beam down-hangers, of disk-gang journal-boxes upon which said down-hangers are supported in slots on said boxes, the lower portion of the scraper-beam down-hanger being of semicircular hook shape and having movement in said slots, substantially as described.

ANDREW GEORGE HILL.

Witnesses:
COLIN MCINNIS,
    *Yeoman.*
W. J. MULLER,
    *Clerk.*